(12) United States Patent
Fischer (10) Patent No.: US 9,628,619 B2
(45) Date of Patent: Apr. 18, 2017

(54) NOMADIC DEVICE SELF USER-IDENTIFICATION

(71) Applicant: Ford Global Technologies, LLC, Dearborn, MI (US)

(72) Inventor: Joel J. Fischer, Royal Oak, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 151 days.

(21) Appl. No.: 14/193,058

(22) Filed: Feb. 28, 2014

(65) Prior Publication Data

US 2015/0249741 A1    Sep. 3, 2015

(51) Int. Cl.
*H04L 29/08* (2006.01)
*H04M 3/42* (2006.01)
*H04M 1/60* (2006.01)
*H04W 4/00* (2009.01)

(52) U.S. Cl.
CPC ........ *H04M 3/42348* (2013.01); *H04L 67/12* (2013.01); *H04L 67/125* (2013.01); *H04M 1/6091* (2013.01); *H04W 4/008* (2013.01); *H04L 67/306* (2013.01)

(58) Field of Classification Search
CPC ....... H04W 4/008; H04W 4/04; H04W 4/046; H04W 8/22; H04W 84/18; H04M 1/72525; H04M 1/27; H04M 1/33; H04M 1/6091; H04M 1/6083; H04M 1/6075; H04L 67/12; H04L 63/102
See application file for complete search history.

(56) References Cited

U.S. PATENT DOCUMENTS

| | | | |
|---|---|---|---|
| 7,508,300 B2 * | 3/2009 | Mock | H04H 20/62 340/425.5 |
| 8,417,415 B2 | 4/2013 | Phelan | |
| 2007/0265744 A1 | 11/2007 | Nicolai | |
| 2011/0195699 A1 * | 8/2011 | Tadayon et al. | 455/418 |
| 2012/0259706 A1 | 10/2012 | Lobaza et al. | |
| 2013/0226371 A1 | 8/2013 | Rovik et al. | |
| 2013/0290043 A1 * | 10/2013 | Hoque | G06Q 10/02 705/5 |
| 2013/0344856 A1 | 12/2013 | Silver et al. | |
| 2014/0333425 A1 * | 11/2014 | Giraud | 340/438 |
| 2014/0362347 A1 * | 12/2014 | Oel | G03B 21/608 353/13 |
| 2015/0112512 A1 * | 4/2015 | Fan | H04L 67/12 701/2 |
| 2015/0149320 A1 * | 5/2015 | Smirin | G06Q 20/14 705/26.8 |
| 2015/0254581 A1 * | 9/2015 | Brahme | G06F 17/30241 705/5 |

\* cited by examiner

*Primary Examiner* — Rafael Pŕrez-Gutiérrez
*Assistant Examiner* — Martin Chang
(74) *Attorney, Agent, or Firm* — Jennifer M. Stec; Brooks Kushman P.C.

(57) ABSTRACT

A controller may send a user-identification request to connected nomadic devices requesting each of the devices to provide an interface to receive user input regarding which device is a driver nomadic device; determine a driver nomadic device based on at least one user-identification response received from the devices responsive to the input; and integrate the connected devices with the controller accounting for which device is the driver nomadic device.

10 Claims, 6 Drawing Sheets

NOMADIC DEVICE SELF USER-IDENTIFICATION

TECHNICAL FIELD

The present disclosure generally relates to vehicle infotainment systems, and more particularly, to systems and methods of self user-identification of which nomadic device is associated with the vehicle driver.

BACKGROUND

When a driver enters a vehicle with a device recognized by the vehicle, the vehicle may automatically pair with the device. Once paired, the device may have access to computing facilities of the vehicle. For safety purposes, if a device is associated with the driver, then that device may have certain functions locked out when the vehicle is in motion.

SUMMARY

In a first illustrative embodiment, a system includes at least one controller configured to send a user-identification request to connected nomadic devices requesting each of the devices to provide an interface to receive user input regarding which device is a driver nomadic device; determine a driver nomadic device based on at least one user-identification response received from the devices responsive to the input; and integrate the connected devices with the controller accounting for which device is the driver nomadic device.

In a second illustrative embodiment, a nomadic device includes at least one controller configured to provide, to a vehicle controller based on input received from a user-identification user interface displayed by the nomadic device, a user-identification indicative of whether the nomadic device is a driver device; receive a user-identification notification from a vehicle controller, the notification indicating whether the device is confirmed to be the driver device; and integrate with the controller in accordance with the notification.

In a third illustrative embodiment, a computer-implemented method includes sending a user-identification request to connected nomadic devices requesting each of the devices to provide an interface to receive user input regarding which device is a driver nomadic device; determining a driver nomadic device based on at least one user-identification response received from the devices responsive to the input; and integrating the connected devices with the controller accounting for which device is the driver nomadic device.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

A vehicle based computing system (VCS) may communicate with one or more nomadic devices within the vehicle. The nomadic devices may have applications installed that may be integrated into the VCS, such that the applications executed in whole or in part by the nomadic devices are included seamlessly into the user interface of the VCS. Aspects of the integration of the nomadic devices with the VCS may depend on whether the nomadic device being integrated into the system is the driver's nomadic device, or is a nomadic device of a passenger. For example, for certain applications to be integrated with the VCS, the driver nomadic device may receive priority over other nomadic devices of the system. Moreover, for a driver's nomadic device, the VCS may be configured to perform various additional actions, such as loading VCS user preferences corresponding to a user of the identified nomadic device and locking out input devices of the identified nomadic device.

When multiple users carrying nomadic devices enter a vehicle, it may be difficult for the VCS to determine which nomadic device is the driver's device, and which device or devices belong to the passengers. For example, a husband and wife may both enter a vehicle, and both may be carrying devices that have been previously been paired with the vehicle. Thus, the VCS may be unable to assume which device belongs to the driver.

Upon detecting that there are multiple possible nomadic devices to choose from within the vehicle, the VCS may request that the nomadic devices perform a self user-identification to allow the VCS to identify which device should be designated as the driver device. The self user-identification (referred to herein as self-identification) may be performed, for example, as a part of integration of the applications of the nomadic devices with a vehicle infotainment system. To facilitate the self user-identification, the VCS may request for each of the detected nomadic devices to provide a user interface designed to receive information regarding which device is the driver nomadic device. By receiving self user-identification information entered via the user interfaces of nomadic devices, the VCS of the vehicle may be able to quickly and easily identify which nomadic device should be selected for integration with the VCS as the driver nomadic device.

Figure 1:
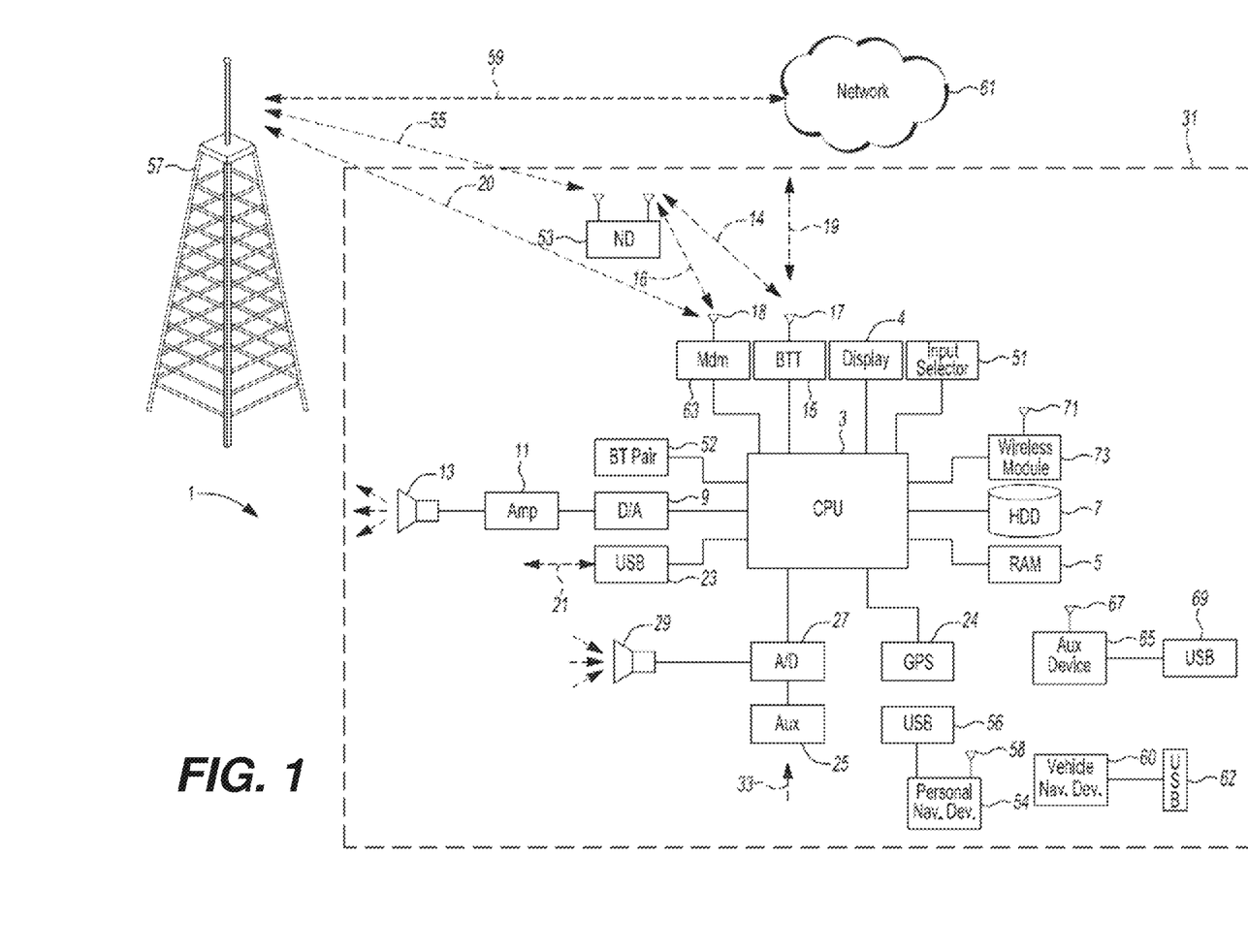
FIG. 1 is an exemplary block topology of a vehicle infotainment system implementing a user-interactive vehicle based computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
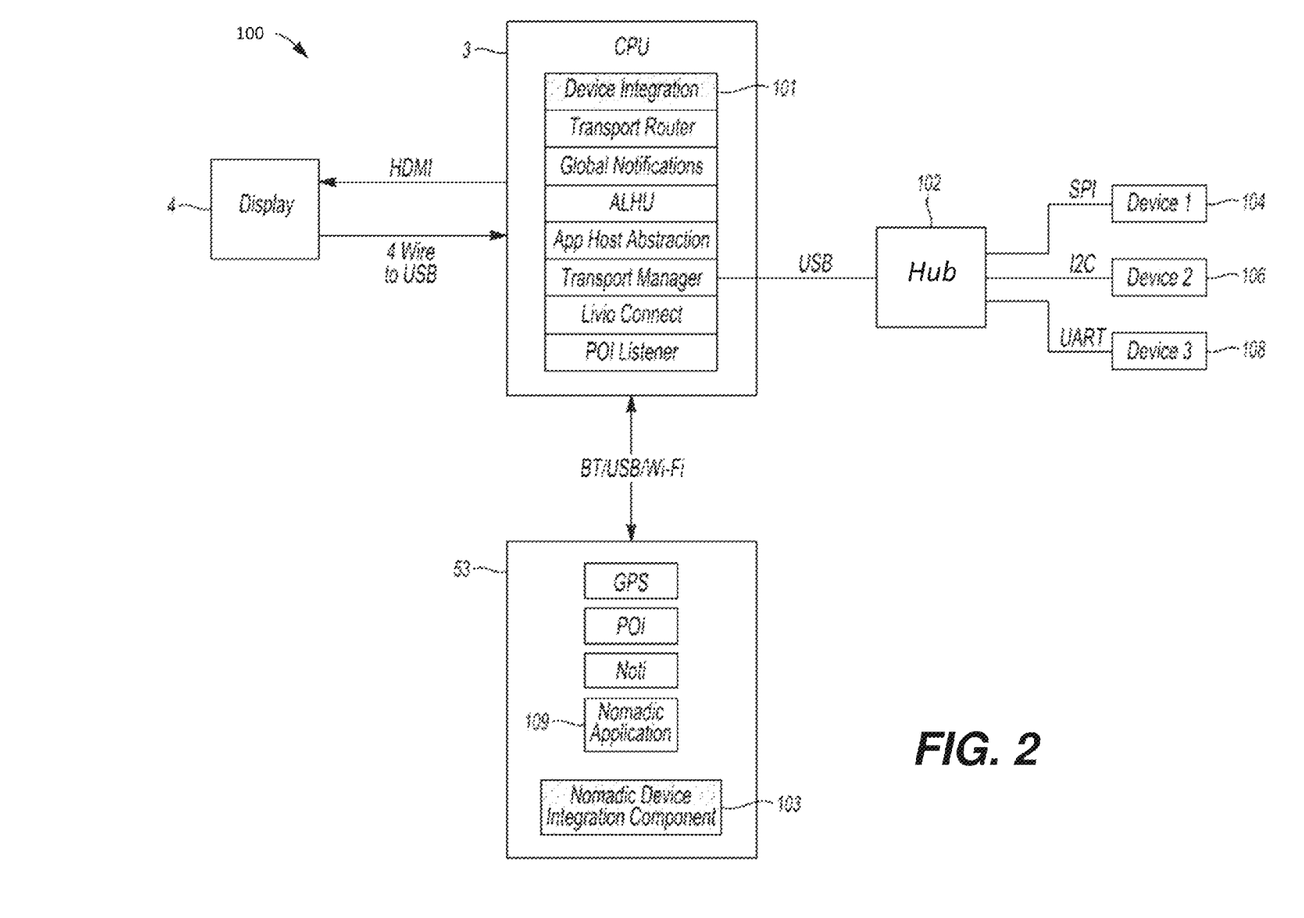
FIG. 2 is an exemplary block topology of an example system for integrating one or more nomadic devices with the vehicle based computing system.

FIG. 2 is an exemplary block topology of a system 100 for integrating one or more connected devices with the vehicle based computing system 1 (VCS). To facilitate the integration, the CPU 3 may include a device integration framework 101 configured to provide various services to the connected devices. These services may include transport routing of messages between the connected devices and the CPU 3, global notification services to allow connected devices to provide alerts to the user, application launch and management facilities to allow for unified access to applications executed by the CPU 3 and those executed by the connected devices, and point of interest location and management services for various possible vehicle 31 destinations.

As mentioned above, the CPU 3 of the VCS 1 may be configured to interface with one or more nomadic devices 53 of various types. The nomadic device 53 may further include a device integration client component 103 to allow the nomadic device 53 to take advantage of the services provided by the device integration framework 101. Applications executed by the nomadic device 53 may accordingly utilize the device integration client component 103 to interact with the CPU 3 via the device integration framework 101. As one example, a music player application on the nomadic device 53 may interact with the CPU 3 to provide streaming music through the speaker 13 or stereo system output of the VCS 1. As another example, a navigation application on the nomadic device 53 may interact with the CPU 3 to provide turn-by-turn directions for display on the screen 4 of the VCS 1.

The multiport connector hub 102 may be used to interface between the CPU 3 and additional types of connected devices other than the nomadic devices 53. The multiport connector hub 102 may communicate with the CPU 3 over various buses and protocols, such as via USB, and may further communicate with the connected devices using various other connection buses and protocols, such as Serial Peripheral Interface Bus (SPI), Inter-integrated circuit (I2C), and/or Universal Asynchronous Receiver/Transmitter (UART). The multiport connector hub 102 may further perform communication protocol translation and interworking services between the protocols used by the connected devices and the protocol used between the multiport connector hub 102 and the CPU 3. The connected devices may include, as some non-limiting examples, a radar detector 104, a global position receiver device 106, and a storage device 108.

Figure 3:
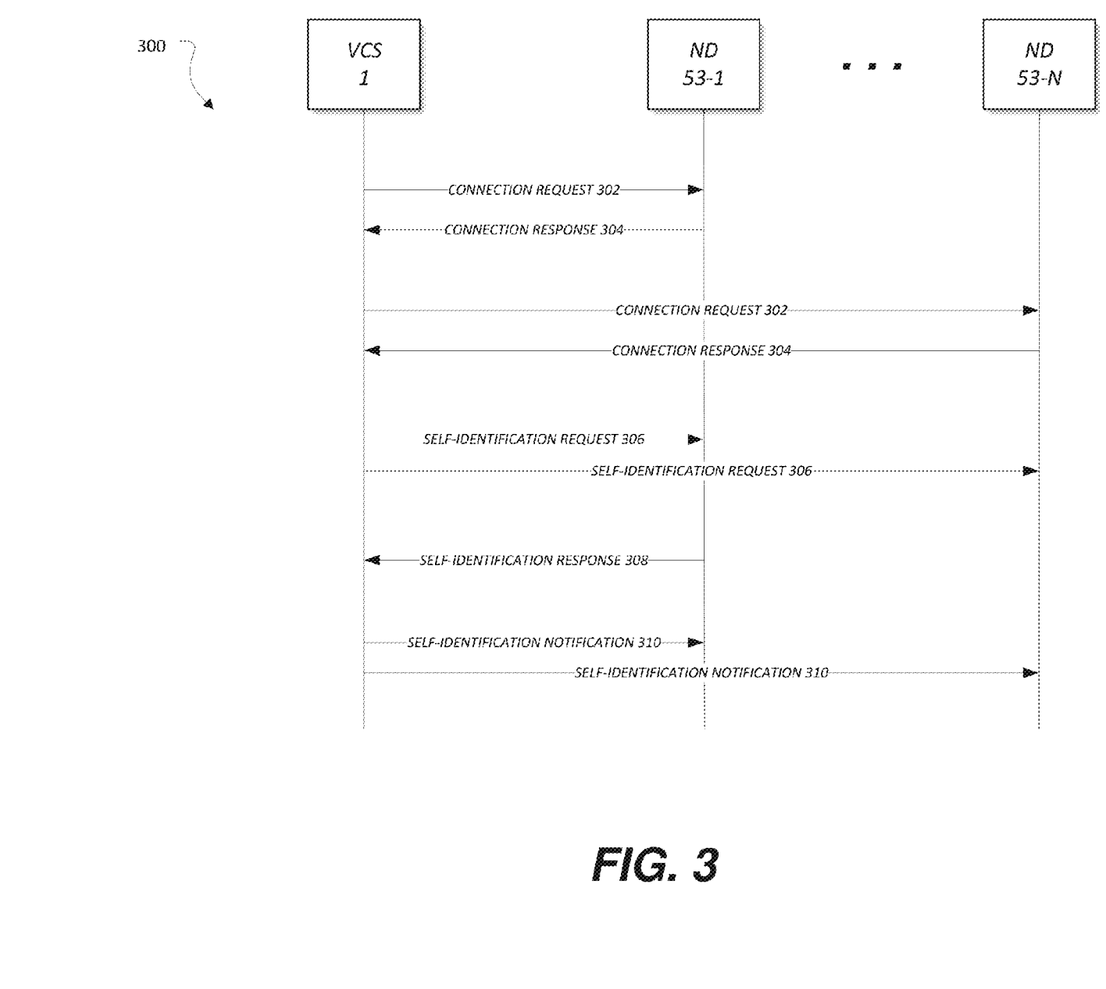
FIG. 3 is a block diagram illustrating the vehicle based computing system in communication with a plurality of nomadic devices.

FIG. 3 is a block diagram 200 illustrating the VCS 1 in communication with a plurality of nomadic devices 53-1 through 53-N (collectively 53). As illustrated, each of the plurality of nomadic devices 53 receives a connection request 302 from the VCS 1, to which the nomadic devices 53 respond with respective connection responses 304. To determine which of the nomadic devices 53 is the driver nomadic device 53, the VCS 1 provides self-identification requests 306 to each of the nomadic devices 53 deemed compatible with the VCS 1. Upon receiving one or more self-identification responses 308, the VCS 1 may be configured to identify which nomadic device 53 is the driver nomadic device 53, and provide self-identification notifications 310 to the nomadic devices 53 indicative of the identification. The nomadic devices 53 deemed to be the driver nomadic device 53 may then be integrated with the VCS 1 as the driver nomadic device 53, and the remaining nomadic devices 53 may be integrated with the VCS 1 as passenger nomadic devices 53.

More specifically, one or more users may enter a vehicle 31, and the VCS 1 may be enabled. For example, a driver may provide a start request to the vehicle 31 via one or more mechanisms including, but not limited to, a vehicle key, a vehicle key fob, a wireless device, and/or a combination thereof.

Upon startup of the VCS 1, the VCS 1 may detect the presence of nomadic devices 53 within the vehicle 31. For example, presence of the nomadic devices 53 within the vehicle 31 may be detected by the VCS 1 by communication between the nomadic devices 53 and the BLUETOOTH transceiver 15 of the VCS 1 or some other sensor capable of detecting the presence of the nomadic devices 53. As another example, detection and connection to the nomadic devices 53 may be performed using WiFi. Or, detection of the nomadic devices 53 may be performed using BLUETOOTH low energy (potentially using another protocol such as BLUETOOTH or WiFi for later connection to the VCS 1 of identified devices 53). As yet a further example, nomadic devices 53 may be detected through wired connection to the VCS 1, e.g., via USB.

Based on identification of the presence of nomadic devices 53, the VCS 1 may send connection requests 302 to the nomadic devices 53 to facilitate connection with the VCS 1. The requests 302 may include information descriptive of the VCS 1, which may allow the nomadic devices 53 to identify whether the nomadic device 53 is compatible with the VCS 1. This information may include, as some examples, information indicative of a hardware model or version of the VCS 1, and software versions of one or more components of the nomadic device 53 with which the VCS 1 is compatible (e.g., integration component version 103, nomadic application 109 version, etc.).

The nomadic devices 53 may receive the connection requests 302, and may determine whether the nomadic devices 53 are able to be connected with the VCS 1. For example, the nomadic devices 53 may determine, based on the hardware and/or software version information provided in the connection requests 302, whether the nomadic devices 53 are compatible with the VCS 1. Each nomadic device 53 deeming itself compatible may be configured to provide a response 304 to the VCS 1 and start a device integration client component 103 to allow the nomadic device 53 to take advantage of the services provided by the device integration framework 101 of the VCS 1. Once integrated with the VCS 1, applications executed by the nomadic device 53 may accordingly utilize the device integration client component 103 to interact with the CPU 3 via the device integration framework 101.

As another aspect of connection, the nomadic devices 53 may be configured to confirm their authorization to connect with the VCS 1. For example, the device integration client component 103 may provide to the VCS 1 one or more unique identifiers of the nomadic device 53 (e.g., username, e-mail address, media access control (MAC) address, subscriber identity module (SIM) information such as international mobile station equipment identity (IMEI), etc.). Using the information, the VCS 1 may be configured to determine whether the nomadic devices 53 are authorized to be connected with the VCS 1. As a further aspect of connection, the VCS 1 may determine, based on the unique identifier information provided via the device integration client components 103, whether the nomadic devices 53 have previously connected to the VCS 1 or are otherwise authorized to connect to the VCS 1. For instance, the VCS 1 may maintain a listing of previously associated nomadic devices 53, and may filter the list of detected nomadic devices 53 to include only those devices on the previously associated list. Based on the determination, the VCS 1 may be configured to integrate only with those nomadic devices 53 that are compatible and authorized to be integrated with the VCS 1. Aspects of the integration of the nomadic devices 53 with the VCS 1 may depend on whether the nomadic device 53 being integrated into the VCS 1 is the driver's nomadic device 53, or is a nomadic device 53 of a passenger. For instance, for a driver's nomadic device 53, the VCS 1 may be configured to perform various actions, such as loading user preferences corresponding to a user of the identified nomadic device 53 and locking out input devices of the identified nomadic device 53. Moreover, for certain integrations with the VCS 1, the driver nomadic device 53 may be the only nomadic device 53 able to integrate with certain functionality, or receive priority to integrate its applications with the VCS 1 over other nomadic devices 53 of the system.

If only a single nomadic device 53 is available for integration, and that nomadic device 53 has previously been associated with the VCS 1 as the driver device (e.g., as identified by inclusion on the VCS 1 listing of previously associated nomadic devices 53), then the VCS 1 may simply associate with the detected nomadic device 53 as the driver device 53. If no nomadic devices 53 are detected by the VCS 1, or if no detected nomadic devices 53 that have previously associated with the VCS 1 are identified as available, then the VCS 1 may determine to not associate with any nomadic devices 53. In such a situation, the VCS 1 may provide a prompt to the user that no known nomadic devices 53 have been located, or may provide a prompt inviting the user to associate a new nomadic device 53 with the vehicle 31.

However, when the VCS 1 detects that multiple nomadic devices 53 that have previously been associated with the VCS 1 are within the vehicle 31 and available for integration, it may be difficult for the vehicle 31 to determine which nomadic device 53 should be associated with the VCS 1 as the driver device. For example, a husband and wife may both enter a family vehicle 31, and both may be carrying nomadic devices 53 that have previously been paired with the VCS 1.

In such a situation, the VCS 1 may be configured to request for the nomadic devices 53 to perform self-identification of which nomadic device 53 should be associated with the VCS 1. For example, the VCS 1 may send self-identification requests 306 to each of the nomadic devices 53 identified as being available for integration. Responsive to the self-identification requests 306, the nomadic devices 53 may be configured to prompt the users for information indicative of which nomadic device 53 should be associated with the VCS 1 as the driver nomadic device 53.

Figure 4:
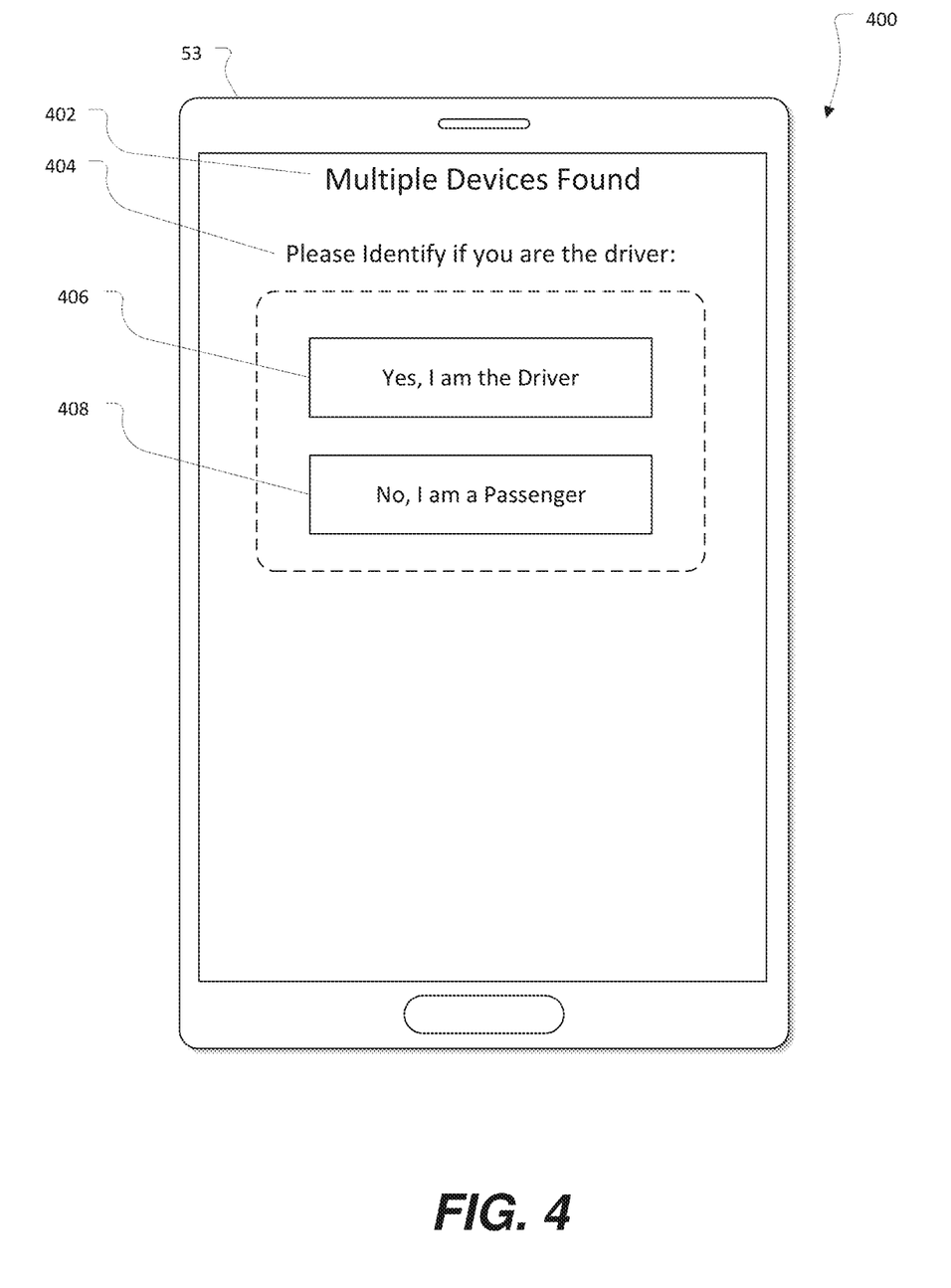
FIG. 4 illustrates an exemplary user interface of a nomadic device to be provided by the nomadic devices upon detection by the vehicle based computing system of multiple potential nomadic devices.

FIG. 4 illustrates an exemplary user interface 400 of a nomadic device 53 to be provided by the nomadic devices 53 upon detection by the VCS 1 of multiple potential nomadic devices 53. The user interface 400 may display an indication 402 that multiple devices 53 are detected, as well as instructions 404 requesting the user to indicate whether the nomadic device 53 displaying the user interface 400 is the driver device 53 or is a passenger nomadic device 53.

The user interface 400 may further include one or more controls configured to receive information from the user regarding how the nomadic device 53 should be integrated with the VCS 1. For example, the user interface 400 may include a first control 406 configured to receive selection that the user is the driver, and a second control 408 configured to receive selection that the user is a passenger. Other variations are possible. For instance, the user interface 400 may only include the first control 406 but not the second control 408, or only the second control 408 but not the first control 406. As another possibility, the user interface 400 may include a dropdown or other list including choices such as "yes, I am the driver" and "no, I am not the driver." Regardless of the specific controls utilized, the user of the nomadic device 53 may utilize the controls to indicate to the nomadic device 53 whether the user is the driver or a passenger. In many cases, once a user makes a selection whether the nomadic device 53 is or is not the driver nomadic device 53, the nomadic device 53 displaying the user interface 400 may dismiss the user interface 400.

Based on input received from the user utilizing the user interface 400, the nomadic device 53 may be configured to identify whether the user of the nomadic device 53 has selected that the nomadic device 53 should be integrated with the VCS 1 as the driver nomadic device 53, or that the nomadic device 53 should not be integrated with the VCS 1 as the driver nomadic device 53.

Returning to FIG. 3, and responsive to the input received using the user interface 400, the nomadic device 53 may be configured to provide a self-identification response 308 to the VCS 1. As one possibility, a self-identification response 308 from a nomadic device 53 may indicate that the device 53 is the driver nomadic device 53, or is not the driver nomadic device 53. As another possibility, the nomadic device 53 may only send the self-identification response 308 to the VCS 1 if the nomadic device 53 receives a selection that it should be integrated with the VCS 1 as the driver nomadic device 53. As yet a further possibility, the nomadic device 53 may only send the self-identification response 308 to the VCS 1 if the nomadic device 53 receives a selection that it should not be integrated with the VCS 1 as the driver nomadic device 53.

Based on self-identification responses 308 received from one or more of the nomadic devices 53, the VCS 1 may be configured to determine which of the nomadic devices 53 should be integrated with the VCS 1 as the driver nomadic device 53. As one possibility, upon receiving a self-identification response 308 indicating that the sending nomadic device 53 is the driver nomadic device 53, the VCS 1 may accept the self-identification. As another possibility, upon receiving self-identification responses 308 that they are passenger devices 53 from all but one of the nomadic devices 53, by process of elimination the VCS 1 may determine which of the nomadic devices 53 is the driver nomadic device 53.

Responsive to making the determination of which nomadic device 53 is the driver nomadic device 53, the VCS 1 may be further configured to provide self-identification notifications 310 back to the nomadic devices 53 (e.g., to the respective device integration client components 103 of the nomadic devices 53). The self-identification notifications 310 may serve, for example, to inform any nomadic devices 53 that have not already done so that they may dismiss the user interface 400. The self-identification notifications 310 may also include additional information, such as one or more of an indication of whether the nomadic device 53 receiving the notification has been determined to be the driver nomadic device 53 or a passenger nomadic device 53, and an identifier of the nomadic device 53 determined to be the driver nomadic device 53.

Thus, by way of receiving the self-identification responses 308 from the nomadic devices 53, the VCS 1 may be able to quickly and easily identify which nomadic device 53 should be selected for association with the VCS 1 as the driver nomadic device 53.

To perform the integration, the VCS 1 may request each nomadic device 53 to provide a listing of applications that are compatible with the VCS 1, and the nomadic device 53 may respond (e.g., using the device integration client component 103) with a listing of applications or services that the nomadic device 53 may be able to provide for integration into the functionality of the VCS 1. The VCS 1 may accordingly compile a listing of applications or services that may be provided by the various nomadic devices 53.

For certain integrations with the VCS 1, such as which nomadic device 53 should be utilized for implementing one or more applications integrated into the VCS 1, the driver nomadic device 53 may receive priority over other nomadic devices 53 of the system. For instance, if the driver nomadic device 53 implements a music player application, that music application of the driver nomadic device 53 may interact with the CPU 3 to provide streaming music through the speaker 13 or stereo system output of the VCS 1 instead of another music player application that may be available on one of the other nomadic devices 53. As another example, a navigation application on the driver nomadic device 53 may take precedence over another navigation application installed on one of the passenger nomadic devices 53. As yet a further example, if no navigation application is installed on the driver nomadic device 53, then another of the nomadic devices 53 implementing such functionality may instead be integrated into the VCS 1 for use for navigation features.

Figure 5:
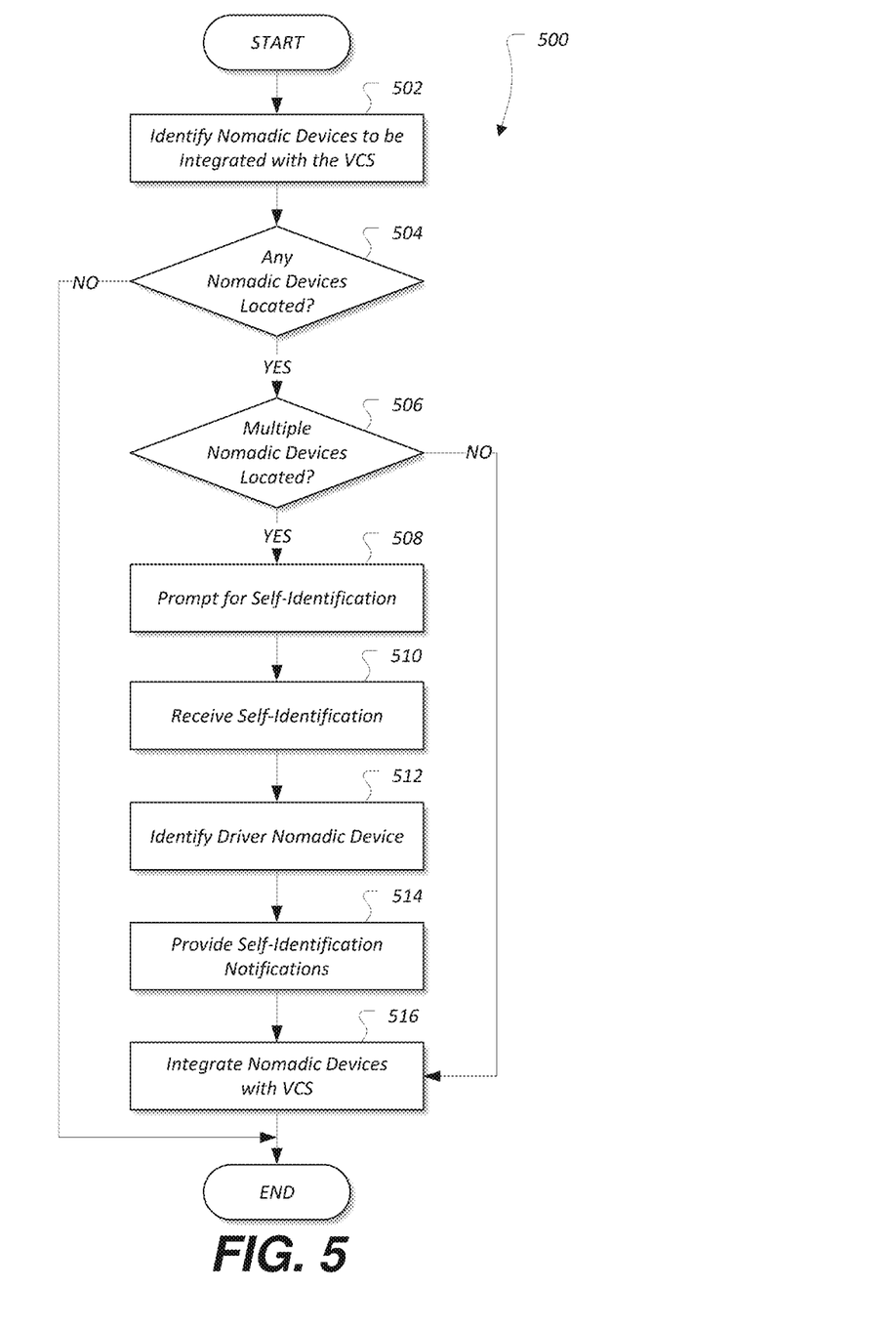
FIG. 5 illustrates an exemplary process for identifying nomadic devices to be associated with the vehicle based computing system as the driver device.

FIG. 5 illustrates an exemplary process 500 for identifying nomadic devices 53 to be associated with the VCS 1 as the driver device 53. The process 500 may be performed, for example, by a CPU 3 of a VCS 1 of a vehicle 31. In other embodiments, the process 500 may be implemented in other controllers, or distributed amongst multiple controllers.

At block 502, the VCS 1 identifies nomadic devices 53 to be integrated with the VCS 1. For example, using one or more transceivers 15, the VCS 1 may provide connection requests 302 to nomadic devices 53. The VCS 1 and nomadic devices 53 may further filter any identified nomadic devices 53 to ensure that the located nomadic devices 53 are compatible with and authorized to use the VCS 1. For instance, the nomadic devices 53 may verify their compatibility according to version or identifying information provided to the nomadic devices 53 from the VCS 1. Additionally or alternately, the VCS 1 may verify authorization according to a listing of identifiers of nomadic devices 53 previously associated with the VCS 1.

At decision point 504, the VCS 1 determines whether any nomadic devices 53 have been located. For example, if the VCS 1 does not identify any nomadic devices 53, or that no identified nomadic devices 53 were authorized or compatible, the process 500 ends. As another possibility, the VCS 1 may prompt the user to associate a new nomadic device 53 with the VCS 1 if nomadic devices 53 were identified but none were previously been associated with the VCS 1 as the driver nomadic device 53. As yet a further possibility, the VCS 1 may prompt the user to upgrade a nomadic device 53 to a newer comparable software version if a device is located that is not compatible due to running an obsolete software version. If authorized and compatible nomadic devices 53 were located, control passes to decision point 506.

At decision point 506, the VCS 1 determines whether multiple nomadic devices 53 have been located. For example, if the VCS 1 identifies that only one previously associated nomadic device 53 has entered the vehicle 31, control passes to block 516 to integrate the VCS 1 with the single nomadic device 53. Otherwise, control passes to block 508. In many examples, if only one listed nomadic device 53 has entered the vehicle, the VCS 1 may further confirm that no passengers are present (e.g., utilizing seat occupancy sensors) before passing control to block 516 to associate the VCS 1 with the single nomadic device 53. Thus, if multiple vehicle occupants are present with only a single listed nomadic device 53, the VCS 1 may still pass control to block 508 to have the single nomadic device 53 self-identify as being the driver device 53, so that the VCS 1 does not incorrectly assume that a single passenger device 53 is the driver device 53.

At block 508, the VCS 1 requests for the connected nomadic devices 53 to perform self-identification. The self-identification may be used to allow the VCS 1 to identify which device 53 should be designated as the driver device 53. For example, the VCS 1 may be configured to send self-identification requests 306 to each of the connected nomadic devices 53, to cause the connected devices 53 to perform the self-identification. Responsive to the self-identification requests 306, the nomadic devices 53 may receive information from the user regarding whether the nomadic device 53 should be integrated to the VCS 1 as the driver nomadic device 53. This information may be requested from the user, e.g., using an interface such as the user interface 400 described above with respect to FIG. 4.

At block 510, the VCS 1 receives self-identification responses 308. For example, the VCS 1 may receive one or more self-identification responses 308 responsive to input received at the nomadic devices 53 using the user interface 400. Each self-identification response 308 from a nomadic device 53 may indicate that the respective device 53 is the driver nomadic device 53, or is not the driver nomadic device 53. Notably, the VCS 1 may not receive a self-identification response 308 from each nomadic device 53.

At block 512, the VCS 1 identifies which nomadic device 53 is the driver nomadic device 53. As one possibility, upon receiving a self-identification response 308 indicating that the sending nomadic device 53 is the driver nomadic device 53, the VCS 1 may accept the self-identification. As another possibility, upon receiving self-identification responses 308 from all but one of the nomadic devices 53 that they are passenger devices 53, by process of elimination the VCS 1 may determine which of the nomadic devices 53 is the driver nomadic device 53.

At block 514, the VCS 1 provides self-identification notifications 310 to the nomadic devices 53. For example, responsive to making the determination of which nomadic device 53 is the driver nomadic device 53, the VCS 1 may be configured to provide self-identification notifications 310 back to the nomadic devices 53. The self-identification notifications 310 may to inform any nomadic devices 53 that have not already done so that they may dismiss the user interface 400, and may also include additional information, such as one or more of: an indication whether the nomadic device 53 receiving the notification has been determined to be the driver nomadic device 53 or a passenger nomadic device 53, and an identifier of the nomadic device 53 determined to be the driver nomadic device 53.

At block 516, the VCS 1 integrates with the nomadic devices 53. For example, the VCS 1 may be able to perform certain actions relating to the nomadic device 53, such as loading vehicle 31 user preferences associated with a user of that nomadic device 53 and providing the nomadic device 53 with access to certain features of the VCS 1 such as to provide information on a display of the VCS 1 (e.g., on a head unit). Further, for certain integrations with the VCS 1 the driver nomadic device 53 may receive priority over other nomadic devices 53 of the system. Moreover, the nomadic device 53 associated with the VCS 1 may have certain functions locked out when the vehicle 31 is in motion. For example, input using a touch screen input device of the nomadic device 53 may be disabled on the associated nomadic device 53. After block 516, the process 500 ends.

Figure 6:
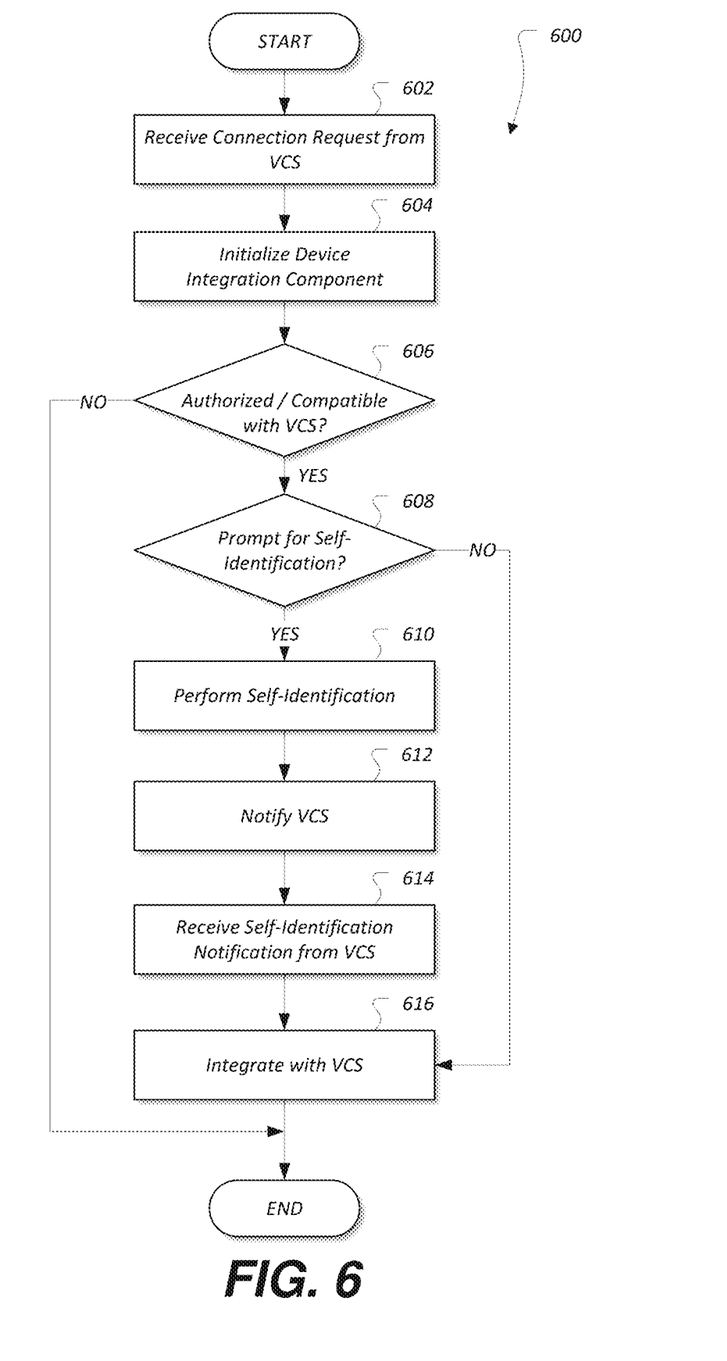
FIG. 6 illustrates an exemplary process for performing user-identification by a nomadic device to be associated with the vehicle based computing system.

FIG. 6 illustrates an exemplary process 600 for performing self-identification by a nomadic device 53 to be associated with the VCS 1. The process 600 may be performed, for example, by nomadic device 53 in communication with a CPU 3 of a VCS 1 of a vehicle 31. In other embodiments, the process 600 may be implemented in other controllers, or distributed amongst multiple controllers.

At block 602, the nomadic device 53 receives a connection request 302 from the VCS 1. For example, presence of the nomadic device 53 within the vehicle 31 may be detected by communication between the nomadic devices 53 and the BLUETOOTH transceiver 15 of the VCS 1 or some other sensor capable of detecting the presence of the nomadic devices 53 (e.g., WiFi, BLUETOOTH low energy, wired USB connection, etc.). Based on identification of the presence of the nomadic device 53, the nomadic devices 53 may receive connection requests 302 from the VCS 1 to facilitate connection with the VCS 1. The requests 302 may include information descriptive of the VCS 1, which may allow the nomadic device 53 to identify whether the nomadic device 53 receiving the request 302 is compatible with the VCS 1.

At block 604, the nomadic device 53 initializes the device integration client component 103 of the nomadic device 53. Accordingly, the nomadic device 53 may utilize the device integration client component 103 to allow the nomadic device 53 to take advantage of the services provided by the device integration framework 101 of the VCS 1. For instance, applications executed by the nomadic device 53 may accordingly utilize the device integration client component 103 to interact with the CPU 3 via the device integration framework 101.

At decision point 606, the nomadic device 53 confirms that it is authorized and/or compatible with the VCS 1. For example, responsive to the connection request 302, the nomadic device 53 may be configured to provide a connection response 304 to the VCS 1 indicative of compatibility of the nomadic devices 53 to be integrated with the VCS 1. As another example, the nomadic device 53 may provide to the VCS 1 one or more unique identifiers of the nomadic device 53 to allow the VCS to determine whether the nomadic device 53 is authorized to be connected with the VCS 1 or has previously connected to the VCS 1. If the nomadic device 53 confirms that it is authorized and/or compatible, control passes to decision point 608. Otherwise, the process 600 ends. At decision point 608, the nomadic device 53 determines whether it should prompt the user for self-identification. For example, if the nomadic device 53 receives a self-identification request 306 from the VCS 1, control passes to block 610. Otherwise, control passes to block 616.

At block 610, the nomadic device 53 performs self-identification. For example, responsive to the self-identification requests 306, the nomadic devices 53 may be configured to provide the user interface 400 to prompt the user of nomadic device 53 for information indicative of which nomadic device 53 should be associated with the VCS 1 as the driver nomadic device 53.

At block 612, the nomadic device 53 notifies the VCS 1 of the result of the self-identification. For example, responsive to the input received using the user interface 400, the nomadic device 53 may be configured to provide a self-identification response 308 to the VCS 1. As one possibility, a self-identification response 308 from a nomadic device 53 may indicate that the device 53 is the driver nomadic device 53, or is not the driver nomadic device 53.

At block 614, the nomadic device 53 receives a self-identification notification 310 from the VCS 1. The self-identification notifications 310 may indicate to the nomadic device 53 whether the device 53 is or is not confirmed to the driver nomadic device 53.

At block 616, the nomadic device 53 integrates with the VCS 1. For example, if the nomadic device 53 identifies from the self-identification notification 310 that it is the driver nomadic device 53, then the nomadic device 53 may lock out certain functions such as use of touch screen displays of the nomadic device 53. Moreover, for certain integrations with the VCS 1, such as which nomadic device 53 should be utilized for implementing one or more applications integrated into the VCS 1, the driver nomadic device 53 may receive priority over other nomadic devices 53 of the system. If the nomadic device 53 is not identified as being the driver nomadic device 53, then functions of the nomadic device 53 may not be locked out, but the device 53 may not be able to affect vehicle user preferences or access the features of the VCS 1. Additionally, the passenger nomadic device 53 may be given lower priority or be unable to integrate certain of its applications with the VCS 1. For example, a navigation application on the driver nomadic device 53 may take precedence over another navigation application installed on one of the passenger nomadic devices 53. As another example, a navigation application on the passenger nomadic device 53 may be unable to integrate with the VCS 1, regardless of whether such an application is available on the driver nomadic device 53. After block 616, the process 600 ends.

Referring again to FIGS. 5 and 6, the vehicle 31 and its components illustrated in FIGS. 1-4 are referenced throughout the discussion of the processes 500 and 600 to facilitate understanding of various aspects of the present disclosure. The processes 500 and 600 may be implemented through a computer algorithm, machine executable code, or software instructions programmed into a suitable programmable logic device(s) of the vehicle 31, such as the vehicle 31 control module, the hybrid control module, another controller in communication with the VCS 1, or a combination thereof. Although the various steps shown in the processes 500 and 600 appear to occur in a chronological sequence, at least some of the steps may occur in a different order, and some steps may be performed concurrently or not at all.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications

What is claimed is:

1. A system comprising:
   at least one controller programmed to:
      send a user-identification request to connected nomadic devices requesting each of the connected nomadic devices to provide an interface to receive user input regarding which connected nomadic device is a driver nomadic device;
      determine a driver nomadic device based on at least one user-identification response received from the connected nomadic devices responsive to the input;
      send, to each of the connected nomadic devices, a notification identifying which of the connected nomadic devices is the driver nomadic device; and
      integrate the connected nomadic devices with the controller accounting for which device is the driver nomadic device.

2. The system of claim 1, wherein the at least one controller is further programmed to provide the driver nomadic device with priority over other connected nomadic devices to integrate applications with the at least one controller.

3. The system of claim 1, wherein the at least one controller is further programmed to, in accordance with the user-identification, at least one of (i) load driver preferences corresponding to a user profile associated with the driver nomadic device, and (ii) request the driver nomadic device to lock at least one input device of the driver nomadic device.

4. The system of claim 1, wherein the at least one controller is further programmed to determine which connected nomadic device is the driver nomadic device according to one of (i) receiving a user-identification response indicating that one of the connected nomadic devices is the driver nomadic device; and (ii) by receiving user-identification responses indicating that one of the connected nomadic devices is a passenger nomadic device from all but one of the connected nomadic devices.

5. A computer-implemented method comprising:
   sending, by a controller, a user-identification request to connected devices requesting each of the connected devices to provide an interface to receive user input regarding which connected device is a driver device;
   determining, by the controller, a driver device based on at least one user-identification response received from the connected devices; and
   sending, to each of the connected devices, a notification identifying which of the connected devices is the driver device.

6. The method of claim 5, further comprising providing the driver device with priority over other connected devices to integrate applications with the controller.

7. The method of claim 5, further comprising, in accordance with the user-identification, at least one of (i) loading driver preferences corresponding to a user profile associated with the driver device, and (ii) requesting the driver device to lock at least one input device of the driver device.

8. The method of claim 5, further comprising determining which device is the driver device according to one of (i) receiving a user-identification response indicating that one of the connected devices is the driver device; and (ii) receiving user-identification responses indicating that one of the connected devices is a passenger device from all but one of the connected devices.

9. The method of claim 5, further comprising sending a user-identification notification to each of the connected devices identifying which connected device is the driver device.

10. The method of claim 5, further comprising integrating the connected devices with the controller accounting for which connected device is the driver device.

\* \* \* \* \*